United States Patent [19]

Brown et al.

[11] Patent Number: 5,687,393

[45] Date of Patent: Nov. 11, 1997

[54] SYSTEM FOR CONTROLLING RESPONSES TO REQUESTS OVER A DATA BUS BETWEEN A PLURALITY OF MASTER CONTROLLERS AND A SLAVE STORAGE CONTROLLER BY INSERTING CONTROL CHARACTERS

[75] Inventors: Lawrence Marcel Brown; Damon W. Finney; George Bohoslaw Marenin, all of San Jose; Adalberto Guillermo Yanes, Sunnyvale, all of Calif.

[73] Assignee: International Business Machines Corporation, Armonk, N.Y.

[21] Appl. No.: 480,010

[22] Filed: Jun. 7, 1995

[51] Int. Cl.⁶ .................... G06F 13/20; G06F 13/36
[52] U.S. Cl. .................. 395/849; 395/300; 395/439; 395/836; 395/82.6
[58] Field of Search ........................ 395/200, 325, 395/124, 800, 650, 725, 275, 700, 821, 846; 179/10; 379/88; 364/200, 900; 370/95.3; 391/425; 371/40.1

[56] References Cited

U.S. PATENT DOCUMENTS

| 4,148,098 | 4/1979 | McCreight et al. | 364/200 |
|---|---|---|---|
| 4,183,089 | 1/1980 | Daughton et al. | 364/900 |
| 5,093,804 | 3/1992 | Cieri et al. | 395/275 |
| 5,191,656 | 3/1993 | Forde, III et al. | 395/325 |
| 5,265,211 | 11/1993 | Amini et al. | 395/325 |
| 5,313,594 | 5/1994 | Wakerly | 395/325 |
| 5,353,417 | 10/1994 | Fuoco et al. | 395/325 |
| 5,392,401 | 2/1995 | Barucchi et al. | 395/200 |
| 5,394,526 | 2/1995 | Crouse et al. | 395/200 |
| 5,418,924 | 5/1995 | Dresser | 391/425 |
| 5,463,643 | 10/1995 | Gaskins et al. | 371/40.1 |
| 5,465,340 | 11/1995 | Creedon et al. | 395/275 |
| 5,499,384 | 3/1996 | Lentz et al. | 395/821 |
| 5,515,512 | 5/1996 | Yamamoto | 395/200 |

*Primary Examiner*—Christopher B. Shin
*Assistant Examiner*—Anderson I. Chen
*Attorney, Agent, or Firm*—Jenkens & Gilchrist; George E. Clark

[57] ABSTRACT

A data processing system includes one or more processors connected to a common bus, one or more I/O controllers connected to the common bus and to one or more storage subsystems and one or more storage subsystems for storing data for use in the data processing system. One or more master controllers are included in each I/O controller for communicating with a memory controller referred to as a slave which controls data flow to and from a memory subsystem. The data bus between the I/O masters and the memory controller is a multi-drop operating synchronously on a two-by-two byte parallel interface.

14 Claims, 11 Drawing Sheets

SYSTEM FOR CONTROLLING RESPONSES TO REQUESTS OVER A DATA BUS BETWEEN A PLURALITY OF MASTER CONTROLLERS AND A SLAVE STORAGE CONTROLLER BY INSERTING CONTROL CHARACTERS

BACKGROUND OF THE INVENTION

1. Field of the Invention

The present invention relates to data processing systems, and more particularly to data processing systems in which data is written to or read from a storage subsystem by method and apparatus employing high speed pipelined data transfers.

2. Prior Art

It is a goal in multi-drop data buses to achieve fast data transfers between chips or modules where data transfers are in short packets for low latency.

There are in the prior art various techniques for achieving this goal.

An example of such a prior art attempt to solve the fast data transfer between chips or modules in a data processing system is U.S. Pat. No. 5,313,594 entitled, "Methods and Apparatus for Data Transfer Between Source and Destination Modules Using a Ready Signal."

The patent teaches a computer system optimized to perform fast block transfers between modules, including local memories which communicate over a multimaster global synchronous bus. Write operations are speeded up by a destination module sending a ready to accept data signal before each write to request. During a given clock period during which a source module delivers a data word to the bus, the destination module asserts the "ready" signal to indicate to the source module that the destination module is ready for the source to deliver another word during another subsequent clock.

Although the '594 patent provides an attempt to solve the problem of fast data transfers on a synchronous bus, the requirement for the destination module to assert a "ready" signal limits the speed and efficiency of data transfer.

Further, although the patent employs a synchronous bus, the patent does not teach nor suggest a techniques for inserting response characters into the data stream to reduce latencies and buffering.

SUMMARY OF THE INVENTION

Therefore, it is a primary object of the present invention to efficiently transfer data in a data processing system having bidirectional synchronous multi-drop data bus employing a pipelined data transfer between modules in the data processing system where the data is transferred in packets to provide low latency with easy break-in indicating successful completion of transfer.

A data processing system according to the present invention includes one or more processors connected to a common bus, one or more I/O controllers connected to the common bus and to one or more storage subsystems and one or more storage subsystems for storing data for use in the data processing system. One or more master controllers are included in each I/O controller for communicating with a memory controller referred to as a slave which controls data flow to and from a memory subsystem. The data bus between the I/O masters and the memory controller is a multi-drop bus operating synchronously on a two-by-two byte parallel interface.

It is an advantage of the present invention that high speed high bandwidth data transfer can be achieved between I/O controller and memory subsystem employing a bidirectional synchronous multi-drop bus with pipeline packet data transfer.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

The present invention optimizes the bus lines for data transfers with closed loop responses at high bandwidth performance. The Date Bus is a multi-drop bus intended to handle memory operations from the master chips to a slave chip in a memory controller. The protocol for the bus is a 2×2 byte parallel interface, it runs at 50 MHz (100 MB each bus), and it is totally synchronous.

Figure 1:
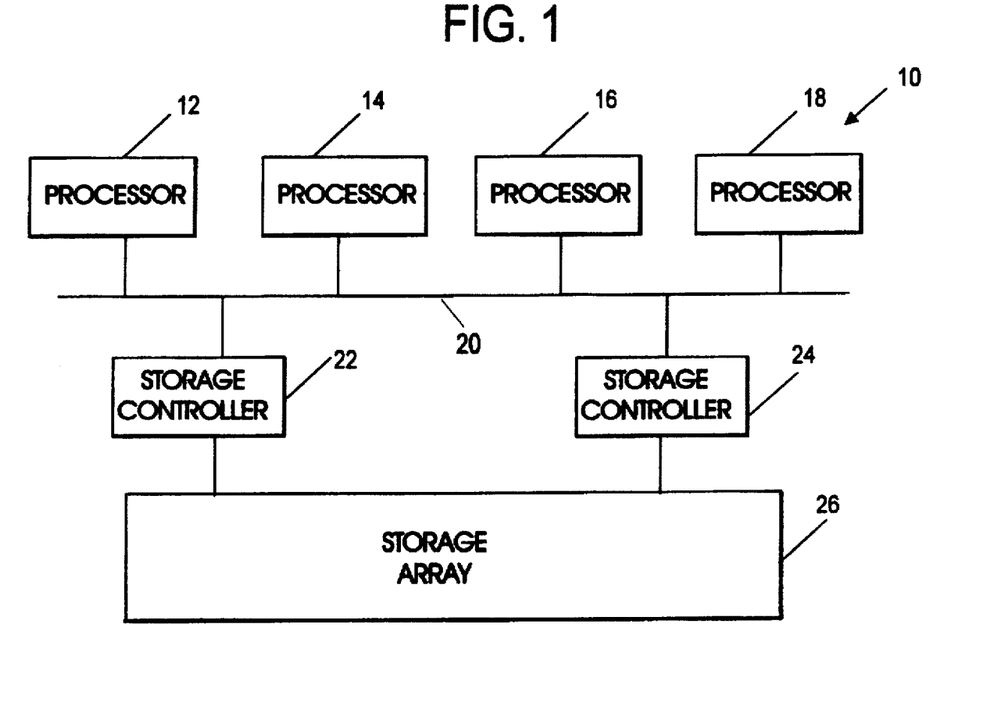
FIG. 1 is a block diagram of a data processing system embodying the present invention.

Referring now to FIG. 1, a data processing system embodying the present invention will be described. A number of parallel processors 12, 14, 16 and 18 are each connected to a bus 20 to which are also connected one or more storage controllers 22, 24. Storage controllers 22 and 24 control reading and writing of data between the processors 12, 14, 16 and 18 and one or more storage arrays 26. Storage array 26 may be implemented as a reduced array of independent drives ("RAID") or by several arrays of storage devices.

Figure 2:
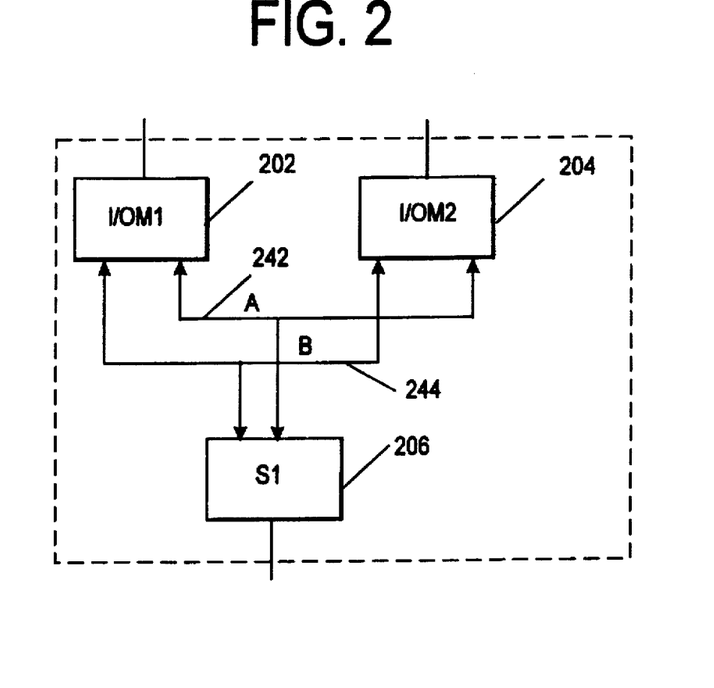
FIG. 2 is a block diagram of a bidirectional synchronous multi-drop data transfer mechanism in accordance with the present invention.

Referring now to FIG. 2, the connection between a number of I/O masters 202 and 204 to slave controller 206 will be described. Each storage controller 22 contains a number of I/O masters connected to bus 20 for communication with processors 12, 14, 16 and 18 and to internal data busses A 242 and B 244 for data communication between masters 202 and 204 and slave 206. Slave 206 is the controller for controlling reads and writes to storage array 26.

DESCRIPTION OF THE DATA BUS

TABLE 1 Shows data bus signals by name, source and destination.

TABLE I

DATA BUS SIGNALS

| Signal Name | Source | Destination |
| --- | --- | --- |
| + Control_A | MASTER OR SLAVE | MASTER OR SLAVE |
| + Data_A(0–15) | MASTER OF SLAVE | MASTER OR SLAVE |
| + Control_B | MASTER OR SLAVE | MASTER OR SLAVE |
| + Data_B(0–15) | MASTER OR SLAVE | MASTER OR SLAVE |
| − Request_0 | MASTER Ø | SLAVE |
| + Grant_A(0:1) | SLAVE | MASTER 0:2 |
| + Request_1 | MASTER 1 | |
| + Grant_B(0:1) | SLAVE | MASTER 0:2 |
| + Sample (A:B) | SLAVE | MASTER 0:2 |
| + Request_2 | MASTER 2 | |

Where:
SLAVE is the Buffer Interface Controller which operates as a slave unit;
MASTER is a Local Interface for Device Attach or a System Attach Controller which operates as a master unit; and

| Signal Name | Signal Definition |
| --- | --- |
| Control_A/B | When this signal is active, it indicates the Data bus contains a Control character (see TABLE II). |
| Data (0–15) | This bus contains the control or data characters as defined for bus frames. |
| Request_0:2 | When this signal is active, it indicates a master is requesting to use either of the Data busses. |
| Grant_A/B(0:1) | These signals are driven to the Master to indicate which Data bus is valid for a particular master.<br>00 - No grants<br>01 - grant for module 334<br>10 - grant for module 336<br>11 - grant for module 338 |
| Sample (A:B) | These signals are driven to the master to indicate when to sample the data bus (driven by the slave). The sample gets generated due to an internal slave request for one of the data bus. This signal validates the data bus receiving logic in the master. |

No parity is provided since all control characters have duplicate bytes and all data is CRC protected.

The Control characters are each two bytes wide and the second byte is a duplicate of the first for redundancy. The valid Control characters are shown in Table II.

TABLE II

DATA BUS CONTROL CHARACTERS

| Binary Value | Control Character |
| --- | --- |
| 0100000001000000 | Null (From Master Only) |
| 0001000000010000 | Break Start of Frame (From Master Only) |

TABLE II-continued

DATA BUS CONTROL CHARACTERS

| Binary Value | Control Character |
| --- | --- |
| 1011TTTT1011TTTT | Success Response from Slave Only |
| 1101000011010000 | Cancel |
| 1110TTTT1110TTTT | Error Response (From Slave Only) |

Note: TTTT is the Tag that is sent as part of the corresponding Master Request Command. The values of TTTT = XXYZ reflect the following information:
XX - 0/1 Module ID - Used by the slave in sending read data on bus
— 00 - Not Used
— 01 - Module 1
— 10 - Module 2
— 11 - Module 3
Y - 0/1 Read = 0/Write = 1
Z - 0/1 Request ID -
Limit 2 Outstanding requests per read/write.

Figure 3:
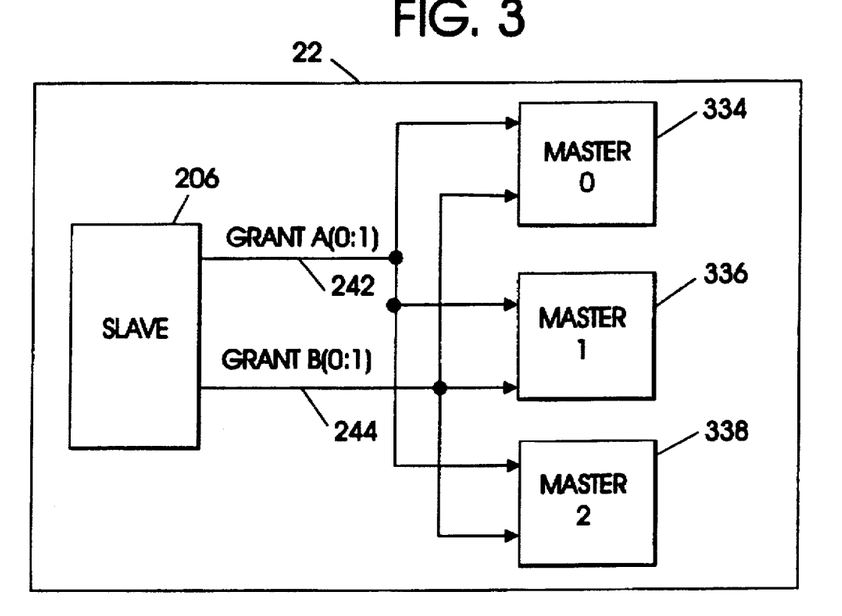
FIG. 3 is a block diagram of the bus control logic of FIG. 2 showing a grant operation.

Referring now to FIG. 3, a grant operation will be described.

Slave Module 206 generates grant signals for bus A on lines 242 to A inputs of master modules 334, 336 and 338. The grant for bus B is transmitted on bus 244 to master modules 334, 336 and 338.

Figure 4:
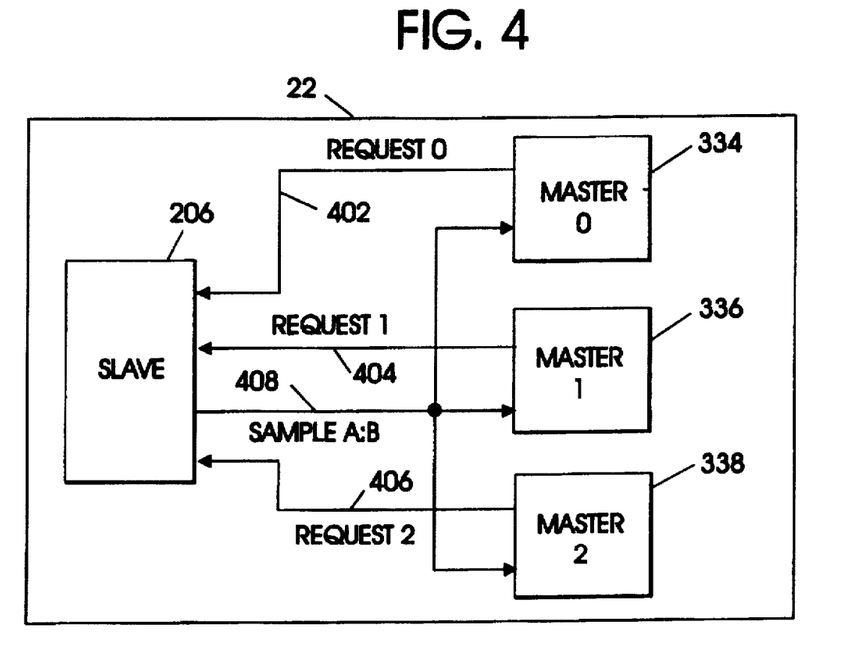
FIG. 4 is a block diagram of the data transfer control logic of FIG. 2 showing a request and sample operation.

Referring now to FIG. 4, request and sample signals shall be described.

Again, as before, Slave Module 206 may receive requests on lines 402 from master module 334, and on line 404 from master module 336, and on line 406 from master module 338. Slave module 206 then sends out a sample signal (sample A:B) on lines 408 to all of the master modules 334, 336 and 338, respectively. The request, grant and sample signals are all described above with respect to Table I in greater detail.

Figure 5:
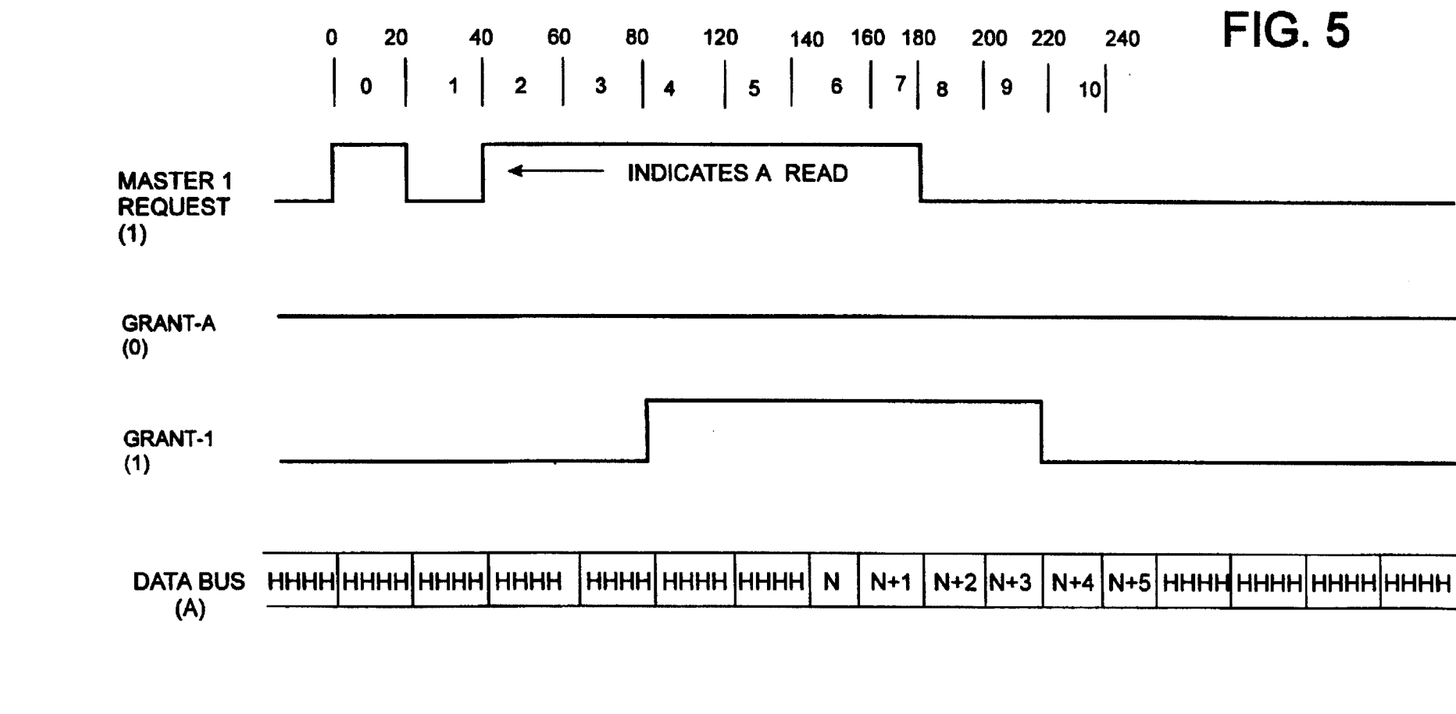
FIG. 5 is a timing diagram for a read data request.

Referring now to FIG. 5, a data request for a read operation will be described in greater detail. FIG. 5 is a timing chart which shows the signals for master module 334 over a number of clock cycles wherein the raising of the request signal for one cycle and then dropping the request signal and then raising the signal again for several clock cycles indicates a read request.

The read request is followed by a grant from slave module 206 with appropriate data being placed on data bus A several cycles after the grant signal becomes active followed by the sample signal on line 408 being activated indicating to the requestor 334 that the data requested to be read is available on data bus A.

Figure 6:
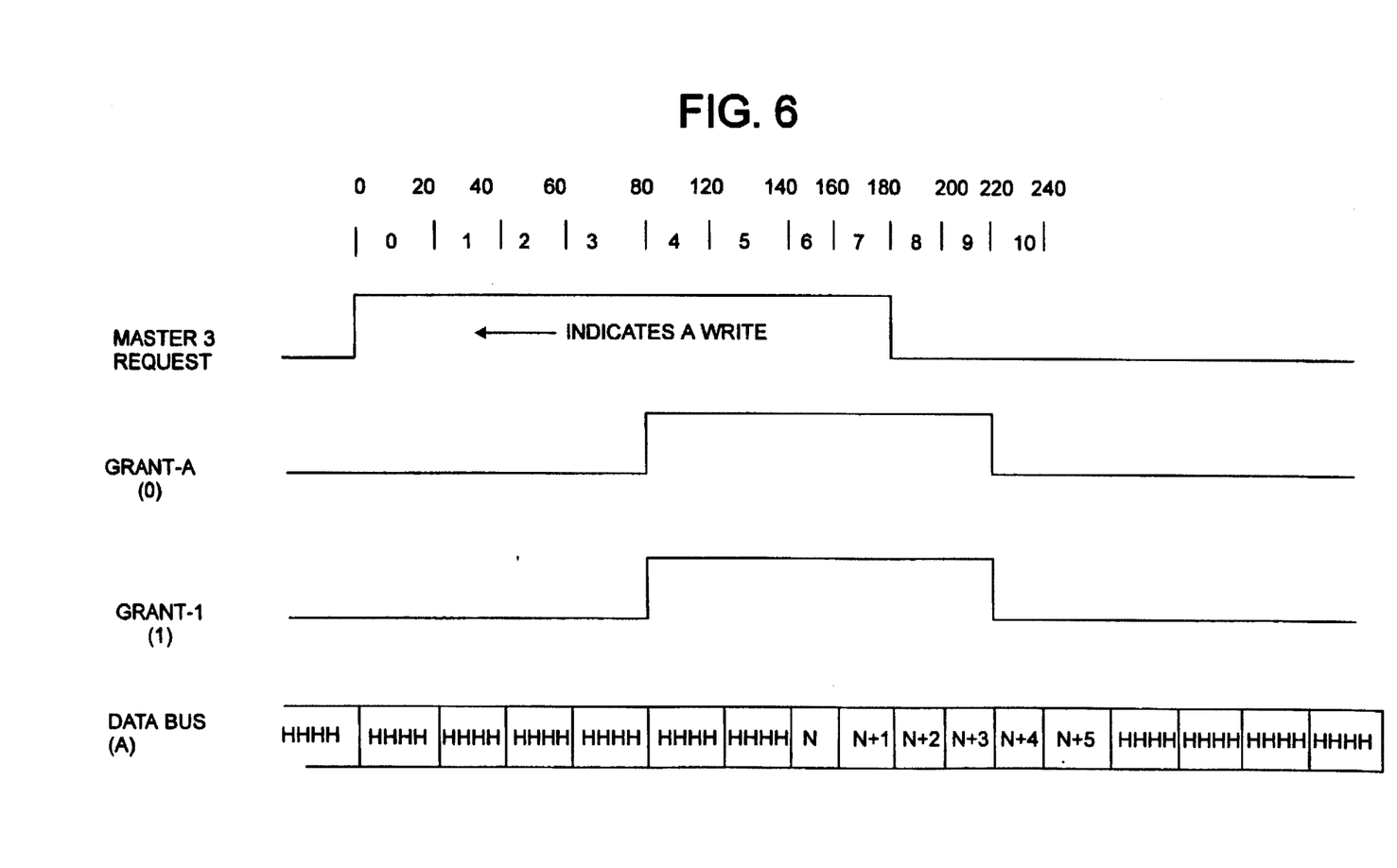
FIG. 6 is a timing diagram for a write data request.

Referring now the FIG. 6, a data request for a write operation will be described. Note that the master module 334 raises the request line at cycle 0 and the request line stays up until the end of cycle 7. This indicated a write request. Subsequently, the grant A and the grant 1 signals are raised and several cycles later the requested write data becomes active on data bus A.

The data request for read and write as described above were single requests separately occurring from a single master module 334.

Figure 7:
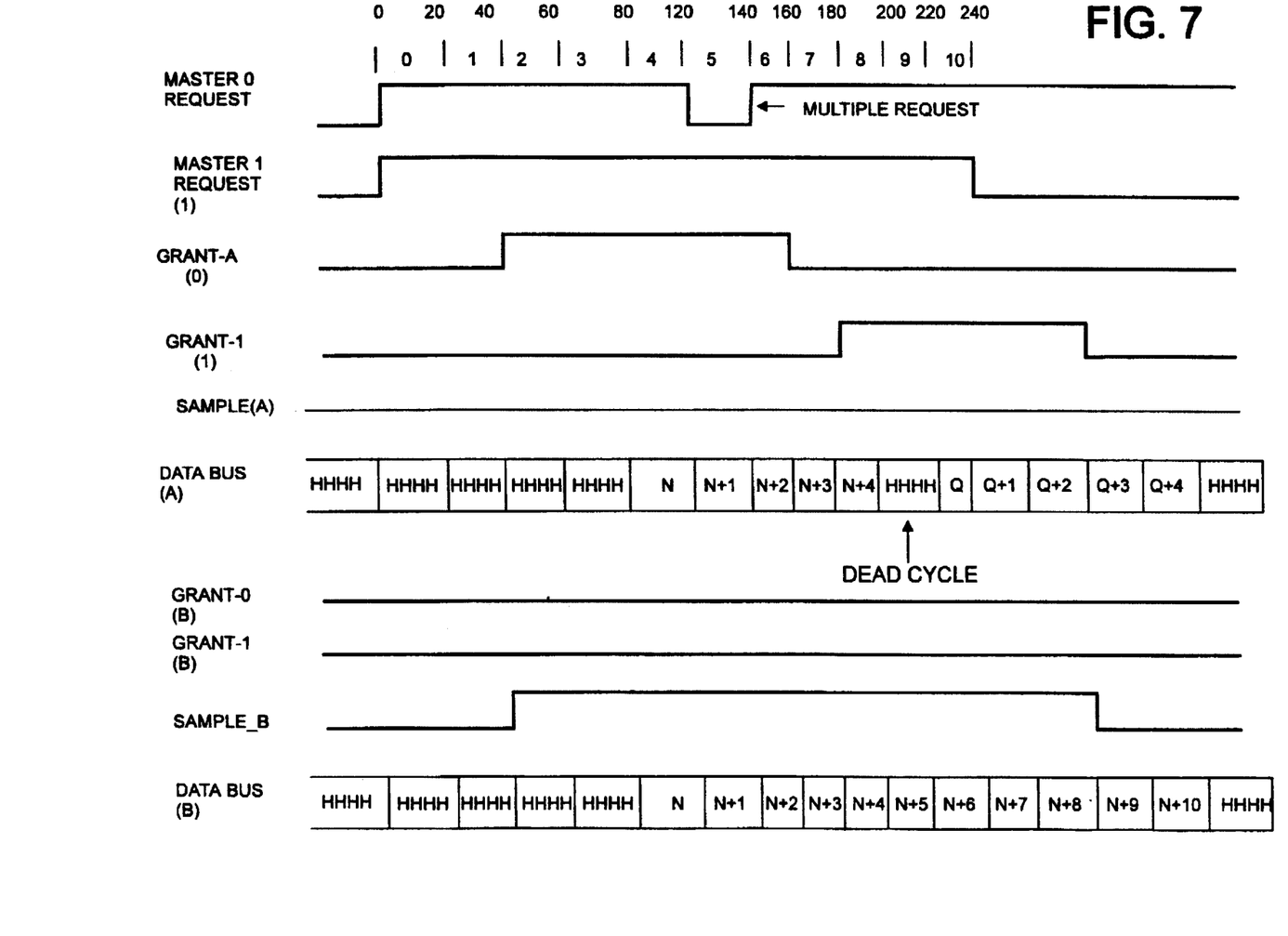
FIG. 7 is a timing diagram showing multiple concurrent requests on one data bus and a sample operation on the other data bus.

Referring now to FIG. 7, two requests for the same data will be described. Master module 334 raises the request line indicating a write request. Concurrently, master module 335 raises the request line indicating a write request. It should be noted that the request from master module 334 is a multiple request since there is a one cycle drop of the request line at cycle 5. The grant 0 for bus A line is raised at the beginning of cycle 2 and the grant 1 for bus A line is raised at the beginning of cycle 8. The data in response to the request from master module 334 becomes active on the data bus A 242 at the beginning of cycle 4 and extends to the end of cycle 8. There is a 1-cycle down period followed by data being active on data bus A 242 in response to the second request from master module 334.

With respect to data bus B 244, grant 0 and 1 for data bus B 244 are inactive whereas sample B becomes active at the beginning of cycle 2 and extends for many cycles thereafter. Subsequently, the data becomes available on data bus B 244 in response to the request from master module 336.

Figure 8:
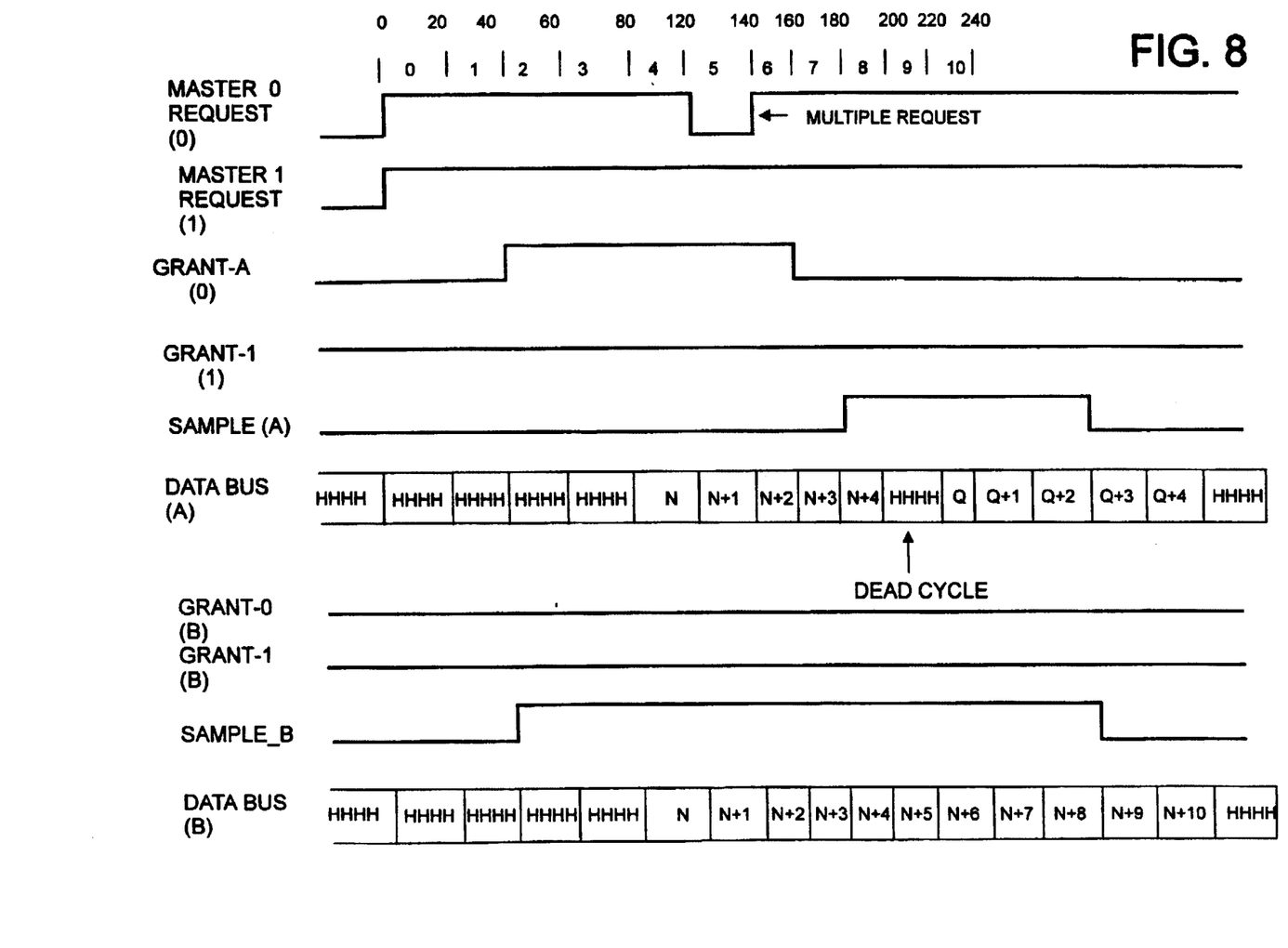
FIG. 8 is a timing diagram of a master to slave operation followed by a slave to master operation on one bus and a sample operation on the second bus.

Referring now to FIG. 8, the timing of a master to slave operation followed by a slave to master operation on one bus with a sample on the other bus will be described. As we discussed above with respect to FIG. 7, master module 334 presents a multiple request signal to slave module 206 and at the same time, master module 336 presents a single request to slave module 206. Slave module 206 raises the grant 0 line indicating a grant of the request to master module 334 and no grant is given to master module 336. Subsequently, data becomes active in data bus A 242 and then a sample signal on lines 408 is raised for bus A. Consequently, no grant to either master module 334 or 336 is granted for bus B but, a sample on bus B is raised at the beginning of cycle 2 and data becomes available to cycles thereafter on bus B.

Figure 9:
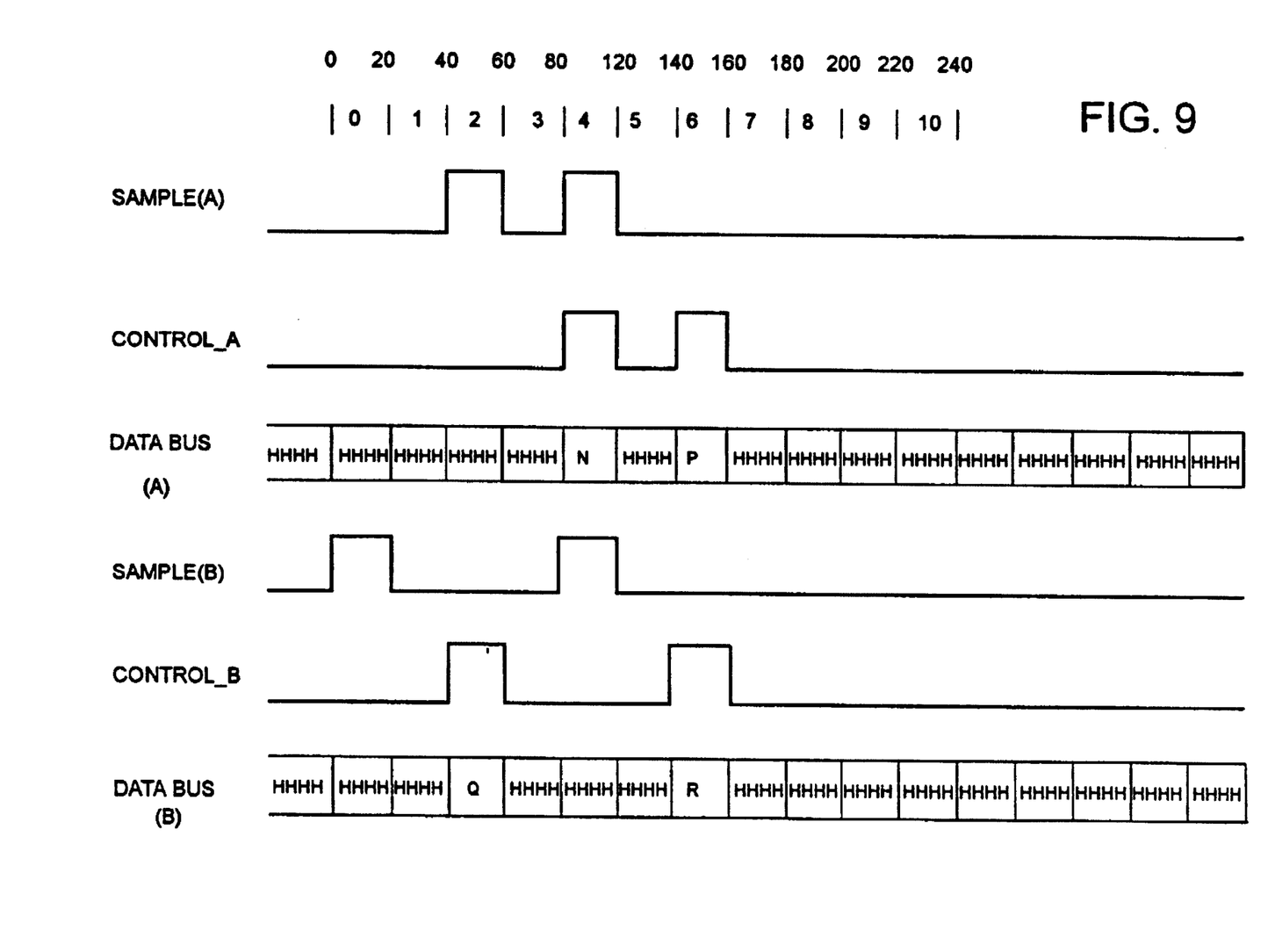
FIG. 9 is a timing diagram showing a success response to a write operation from the slave to the master.

Referring now to FIG. 9, a timing diagram is shown indicating a slave module 206 sending a success response signal as a result of a write operation. Slave module 206 raises a sample signal on bus A 242 during cycle 2 and again during cycle 4. During cycle 4 and cycle 6, slave module 206 raises control A indicating that data bus A 242 contains a control character as described in Table II rather that data. Thus, the character N, shown in data bus A at cycle 4, represents a control character and not data. Likewise, in cycle 6 control A is active, indicating that the character P on data bus A 242 in cycle 6 represents a control character. Similarly, with respect to data bus B 244, sample B occurs at cycles 0 and 4 followed by control B in cycles 2 and 6. The control B signalled in cycles 2 and 6 indicate that the data bus 244 contains control characters during cycles 2 and 6, respectively.

Data Bus Protocol

All memory operations consist of a Master Control Frame sent by the Master followed by a Slave Response Frame or a Success—Response Control character sent by the Slave. The Control and Response frames have two forms depending on whether the memory operation is a Read or a Write XOR.

The parity function of RAID architecture covers n slots from n data disks by a slot on a parity disk. These n data slots and the parity slot together are called a parity group. When any disk fails, the lost data or parity can always be recovered by the parity group from the remaining n disks. High speed parity slot generation may be accomplished by a hardware Exclusive Or (XOR). The XOR will take two input data streams, which are byte synchronized to generate one output data stream.

To calculate a parity slot, the XOR function should be invoked n times where n is the number of data disks in a parity group. Each time an output port of a node specifies one of the n data slots in the parity group. At the same time, an input port specifies the same parity slot of the parity group.

Figure 13:
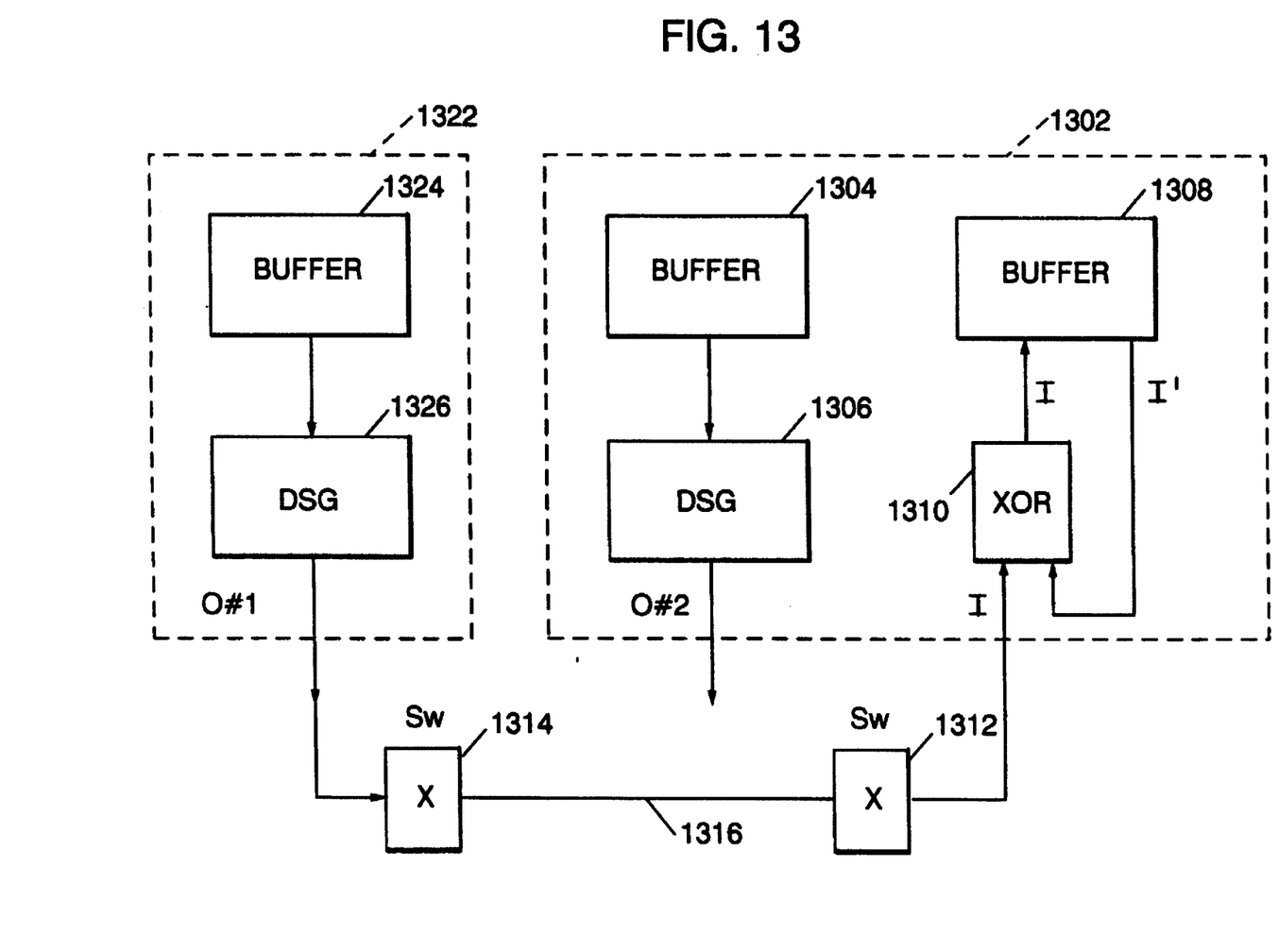
FIG. 13 is a block diagram illustrating the Exclusive Or function as used in a parity function.

Referring now to FIG. 13, a single source dual node example of a hardware Exclusive Or will be further described.

Nodes 1302 and 1322 are each connected to a bus 1316 through switches 1312 and 1314, respectively. A first node 1302 contains an output port which outputs data from buffer 1304 through data stream generator 1306. An input port is connected to one input of Exclusive Or circuit 1310 which has its output connected to input buffer 1308.

Typically, node 1302 may be a slave module 206 as described above. The input data stream I to Exclusive Or 1310 is Exclusive Ored with an output of data from buffer 1308 at an address contained in the input data stream I. The result of the Exclusive Or operation in Exclusive Or circuit 1310 is new data which is then stored into the address location specified. The Success_Response Control character is a single two byte Control character which is used for a fast response to a successful Write or XOR operation (the normal case).

Node 1322 includes a buffer 1324 and a data stream generator 1326 which generates a data stream output of node 1322 from data stored in buffer 1324.

The Success Response Control character is a single two byte Control character which is used for a fast response to a successful Write or XOR operation (the normal case).

All control characters (including Nulls) may be sent in the middle of a frame. A valid control or data character must be sent every cycle that the owner of the bus has a grant/sample.

If an error is detected during a write or read the SLAVE will realm an error response control character.

Each Master may have two Write operations and two Read Operations outstanding (Master frame sent but no Response frame received) at any point in time. This allows the bus to be used to transfer additional commands or response frames while previous command frames are queued for memory.

Master Frame Definition

Figure 10:
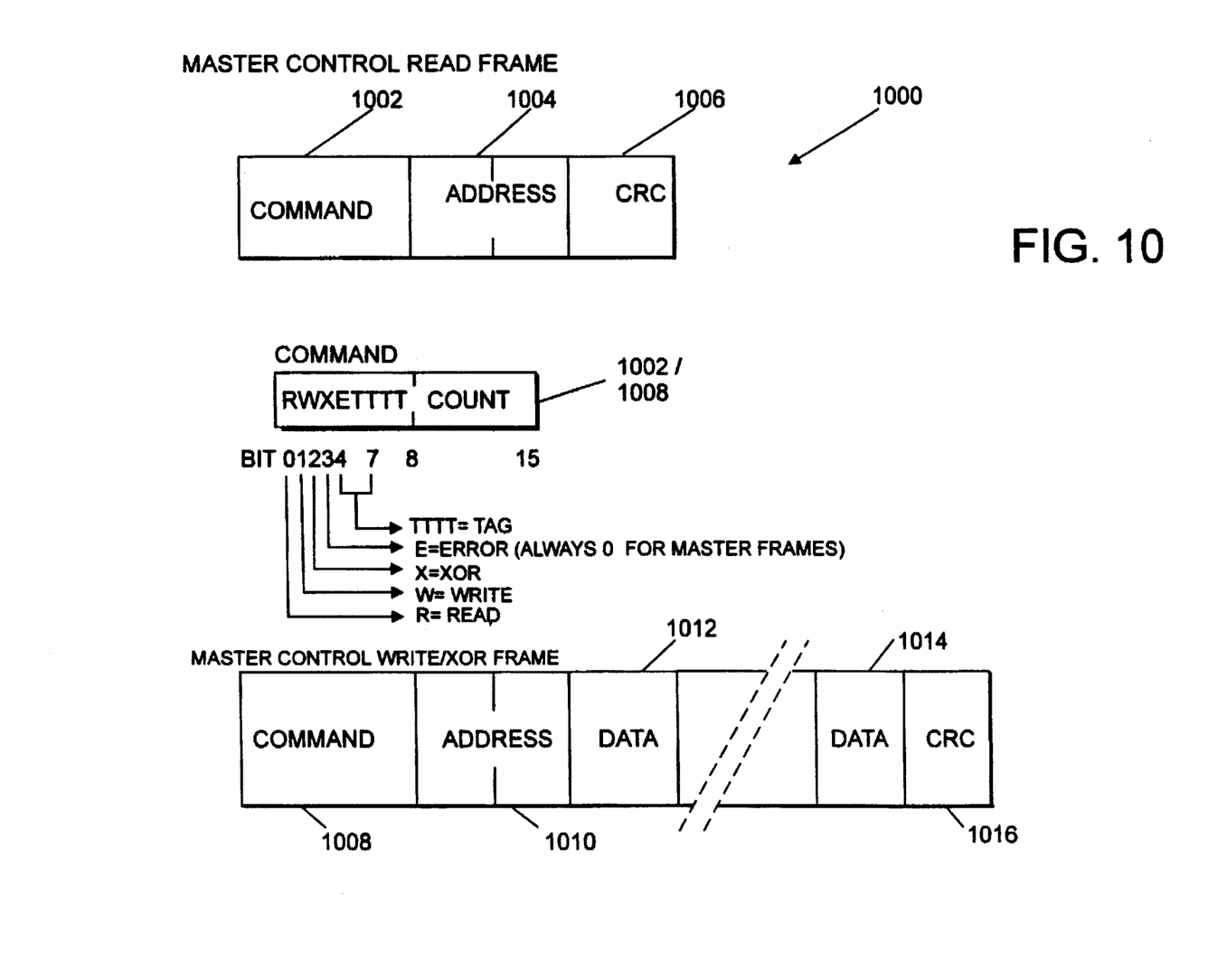
FIG. 10 is a schematic diagram of a master control frame in accordance with the present invention.

Referring now to FIG. 10, the master control flames 1000 will be described. There are two types of master control frames 1000. The first is for a read operation and consists of a 2-byte command 1002, a 4-byte address 1004, and a 2-byte cyclical redundancy character 1006. The second type of master control frame 1000 is for a Write or an XOR operation and consists of a 2-byte command 1008, a 4-byte address 1010, data bytes 1012, 1014, as specified in the court field of command 1008, and a 2-byte CRC 1016. Command 1002, 1008 has a first byte which contains 3 bits indicating the type of operation with one bit indicating a read, one bit indicating a write, and one bit indicating a XOR. The fourth bit of the first byte of the command 1002. 1008 is always 0. The remainder of the first byte includes a 4-bit tag which is copied to the response frame the response is associated with. The second byte of command 1002, 1008 is an 8-bit count field which indicates byte count for the memory operation being performed.

Slave Frame Definition

Figure 11:
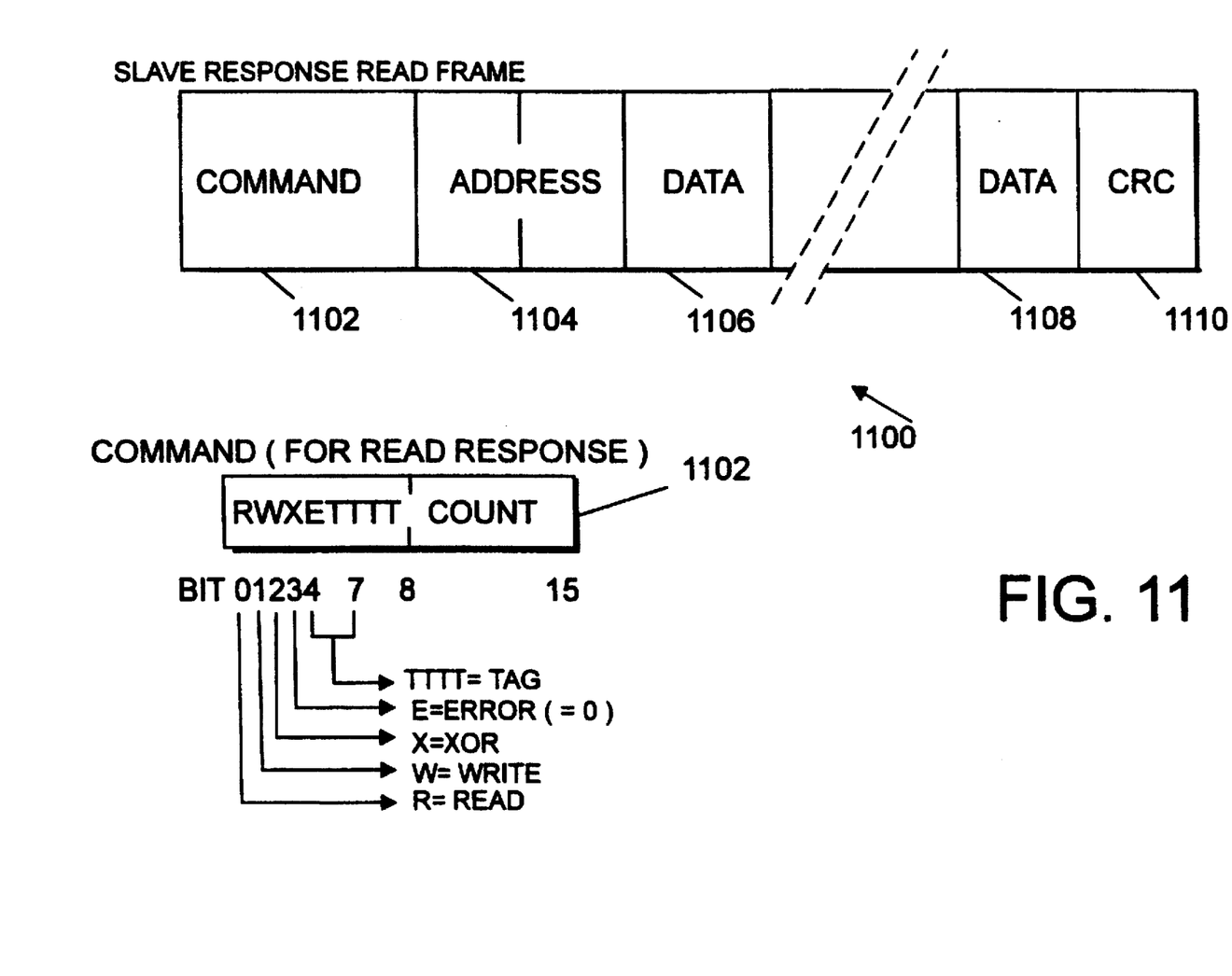
FIG. 11 is a schematic diagram of a slave response frame in accordance with the present invention.

Referring now to FIG. 11, the slave response frame 1100 will be described. The slave response frame for read operations 1100 consists of a 2-byte command 1102, a 4-byte address 1104, a number of data bytes specified in the count field of the command 1106, 1108, and a 2-byte CRC 1110.

For read response frames in slave module 206, 2-byte command 1102 is a copy of command 1002, 1008 in the master control frame 1000, as described above with reference to FIG. 10. However, the error bit in command 1102 is used for reporting hardware errors during bus or memory operations which prevents the completion of the operation. Control characters, CRC, data count, address range checking and ECC in memory are tested for errors.

If either master 336 or slave 206 detects any error during the middle of sending a frame, the frame may be aborted by immediately sending the CRC for the data sent followed by a cancel control character. The cancel control character should prevent any other checks from being reported, such as count mismatch or CRC errors. If any noncontrol characters get sent after sending the cancel control character, an error condition will set illegal cancel character.

If master module 334 does not have any data to send, it can replace data frame 1012, 1014 with a null control character.

A break start control character may be used to indicate that a short read control frame is being inserted in the middle of a write/XOR control frame. This is done to induce the latency of the read operation with only a small time penalty to the write/XOR operation. The break start control characters should be sent only after the command/address field within the master control write/XOR control frame 1000. The break control character is always followed by the command/address/CRC after the CRC frame for the write data will be sent.

Cancel Control Character

If either the Master or Slave detects any error during the middle of sending a frame, they may abort the frame by immediately sending the CRC (for the data sent) followed by the Cancel Control character. The cancel control character should prevent any other checks from being reported like count mismatch and CRC errors. If any non-control characters get sent after sending the Cancel Control Character, a check will get set—Illegal Cancel character. This check detects any unexpected cancel characters.

Null Control Character

If the Master does not have any data to send it can replace the data frame with a null control character. Note that the command and address frame should not be replaced with a Null Control character. The Null character can only be inserted after the second address frame and before the CRC frame.

Break Control Character

The Break_Start Control character is used to indicate that a short Read Control Frame is being inserted in the middle of a Write/XOR Control Frame. This is done to reduce the latency of the Read operation with only a small penalty to the Write/XOR operation. The Break_Start Control characters should be sent only after the Command/Address field within the Master Control Write/XOR control frame. The Break Control Character is followed always by the command/address/CRC after the CRC frame the write data will be sent. Note that Null control characters cannot be sent as part of the read request (after the break control character). The Break character can only be inserted after the second address frame and before the CRC frame.

Error Response

On writes when the master is sending data to the slave, if the slave detects an error it will respond with an Error Response Control character. The error response control character simply states an error has occurred. To determine the actual specific type of error the slave error checker register needs to be read. Note the slave will report an interrupt due to an error. The following is a list of errors the slave will report.

Invalid Control Character
  Illegal Control Character
  Illegal Cancel character
CRC Error
Count Mismatch
Address Error
  Illegal Address Response on the CMI Note the CRC error response from the slave on writes invalidates the tag information being sent. The master can not depend on the tag information in marking their requests invalid.

When the master detects an error on writes it will abort the operation with a cancel character. The slave will not generate a response due to the cancel character even though errors may have been detected. The slave will send the cancel control character during a read if it detects an error. One check that can cause this is an internal slave data parity check on the data getting sent to the master.

If the slave detects an error on reading the data from memory on a read operation, it will just send an Error Response Control character since the check was detected before starting the read operation on the data bus interface.

Maximum Data Size

The maximum data size allowed in one frame is 128 bytes (does not include command, address or CRC). This is an arbitrary limit imposed to limit the amount of buffering required and to limit the latency due to long transfer.

Maximum Outstanding Requests

The maximum read requests and write operations from any master is two. The slave supports via buffering a total of four read requests and four write operations. The master must keep track of their outstanding read requests and write operations so not to exceed their limit per transmission link when reading or writing compressed data only.

At initial Power-On (after selftest) the Master may send two Write Command flames and Read Command flames without receiving any Response flames.

The Data bus CRC Definition

The following describes XOR structure of the data bus interface CRC. The CRC is two bytes wide and is initially reset to ones. The generator polynomial is:

$$G(x)=x^{16}+x^{12}+x^5+1$$

| | |
|---|---|
| + | is defined to the Exclusive Or (XOR) function |
| d0–d15 | denotes the incoming data bits |
| c0–c15 | denotes the newly calculated crc (n state) |
| p0–p15 | denotes the previous crc (n-1 state) |
| pd0–pd15 | denotes p(x) .xor. d(x) |

0  c(0) = pd(4) + pd(5) + pd(8) + pd(12)
1  c(1) = pd(5) + pd(6) + pd(9) + pd(13)
2  c(2) = pd(6) + pd(7) + pd(10) + pd(14)
3  c(3) = pd(0) + pd(7) + pd(8) + pd(11) + pd(15)
4  c(4) = pd(0) + pd(1) + pd(4) + pd(5) + pd(9)
5  c(5) = pd(1) + pd(2) + pd(5) + pd(6) + pd(10)
6  c(6) = pd(0) + pd(2) + pd(3) + pd(6) + pd(7) + pd(11)
7  c(7) = pd(0) + pd(1) + pd(3) + pd(4) + pd(7) + pd(8) + pd(12)
8  c(8) = pd(0) + pd(1) + pd(2) + pd(4) + pd(5) + pd(8) + pd(9) + pd(13)
9  c(10) = pd(2) + pd(3) + pd(4) + pd(6) + pd(9) + pd(10) + pd(14)
10 c(10) = pd(2) + pd(3) + pd(4) + pd(6) + pd(7) + pd(10) + pd(11) + pd(15)
11 c(11) = pd(0) + pd(3) + pd(7) + pd(11)
12 c(12) = pd(0) + pd(1) + pd(4) + pd(8) + pd(12)
13 c(13) = pd(1) + pd(2) + pd(5) + pd(9) + pd(13)
14 c(14) = pd(2) + pd(3) + pd(6) + pd(10) + pd(14)
15 c(15) = pd(3) + pd(4) + pd(7) + pd(11) + pd(15)

Data Bus Timing

Figure 12:
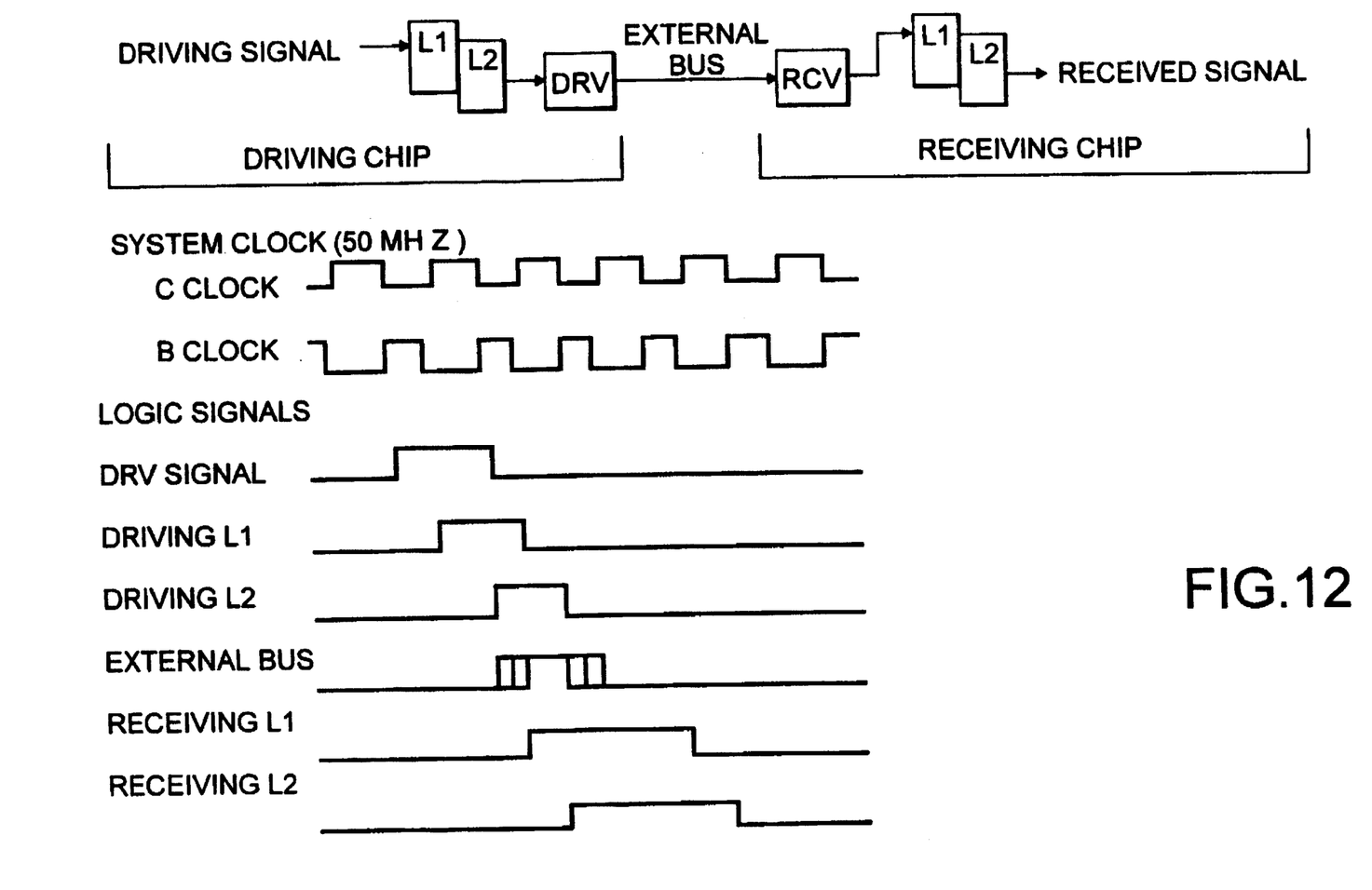
FIG. 12 is a timing diagram showing Data Bus and Clock signals in accordance with the present invention.

All control and data characters are sent and received in same cycle as shown in FIG. 12. All Data Bus signals must be latch bounded in order to meet the timing requirements of sending one two byte character every 20 ns cycle.

Although the present invention and its advantages have been described in detail, it should be understood that various changes, substitutions and alterations can be made herein without departing from the spirit and scope of the invention as defined by the appended claims.

What is claimed is:

1. An information handling system, comprising:
   one or more processors connected to a common bus;
   one or more I/O controllers connected to the common bus and to one or more storage subsystems, each I/O controller comprising:
   a plurality of master controllers for communicating with a slave storage controller which controls data flow to and from a storage subsystem by granting access to one or more of the plurality of master controllers;
   a data bus connecting the master controllers and the slave storage controller, said data bus operating synchronously between the master controllers and the slave storage controller;
   means for controlling responses to requests over the data bus after access has been granted, the control means comprising:
   means for inserting one or more control characters into a data stream, each control character having a field which identifies characteristics of data transmission between one of the master controllers and the slave memory controller; and
   one or more storage subsystems for storing data.

2. A data processing system according to claim 1, further comprising:
   a master control frame for controlling the operation of said one or more master controllers.

3. A data processing system according to claim 2 wherein said master control frame further comprises:
   a first control frame for read operations; and
   a second control frame for write or Exclusive Or operations.

4. A data processing system according to claim 1, further comprising:
   a slave response frame.

5. A data processing system according to claim 4 wherein said slave response frame further comprises:
   a first slave response frame in response to a read operation;
   a second response frame in response to a write or Exclusive Or operation; and
   a third response frame to signal success of a write or Exclusive Or operation.

6. A data processing system according to claim 1, wherein said bus further comprises:
   a plurality of busses having the capability of being switched between a plurality of master controllers or a plurality of slave controllers to reduce latency and improve system performance.

7. A data processing system according to claim 1, further comprising:
   a plurality of control characters for controlling data transmission on said synchronous bidirectional common bus.

8. A data processing system according to claim 7, wherein said control characters further comprise:
   null characters which may be inserted in a data stream to maintain synchronization when data are delayed.

9. A data processing system according to claim 7, wherein said control characters further comprise:
   cancel characters which may be inserted in a data stream for immediate termination of said data stream.

10. A data processing system according to claim 7, wherein said control characters further comprise:
    a break character which may be inserted in a data stream to permit an immediate response indicating success or failure of a previous transmission.

11. A storage controller for controlling the storage of data in a storage subsystem of a data processing system, comprising:
    a plurality of master controllers for communicating with a slave storage controller which controls data flow to and from a storage subsystem by granting access to one or more of the plurality of master controllers;
    a data bus connecting the master controllers and the slave storage controller, said data bus operating synchronously between the master controllers and the slave storage controller;
    means for controlling responses to requests over the data bus after access has been granted, the control means comprising:
    means for inserting one or more control characters into a data stream, each control character having a field which identifies characteristics of data transmission between one of the master controllers and the slave memory controller.

12. A storage controller, according to claim 11, further comprising:
    a master control frame for controlling the operation of said one or more master controllers.

13. A storage controller, according to claim 12, wherein said master control frame further comprises:
    a first control frame for read operations; and
    a second control frame for write or Exclusive Or operations.

14. A storage controller, according to claim 11, wherein said control field comprises:
    a first portion for identifying one of said master controllers;
    a second portion for identifying a type of operation to be performed; and
    a third portion for identifying an outstanding request.

* * * * *

UNITED STATES PATENT AND TRADEMARK OFFICE
CERTIFICATE OF CORRECTION

PATENT NO.    : 5,687,393

DATED         : November 11, 1997

INVENTOR(S)   : BROWN ET AL

It is certified that error appears in the above-indentified patent and that said Letters Patent is hereby corrected as shown below:

Column 6, line 36          Delete "flames"
                                                        Replace with --frames--

Signed and Sealed this

Tenth Day of February, 1998

Attest:

BRUCE LEHMAN

Attesting Officer         *Commissioner of Patents and Trademarks*